G. M. WRIGHT.
RADIOGONIOMETER.
APPLICATION FILED APR. 16, 1921.
1,426,137.
Patented Aug. 15, 1922.
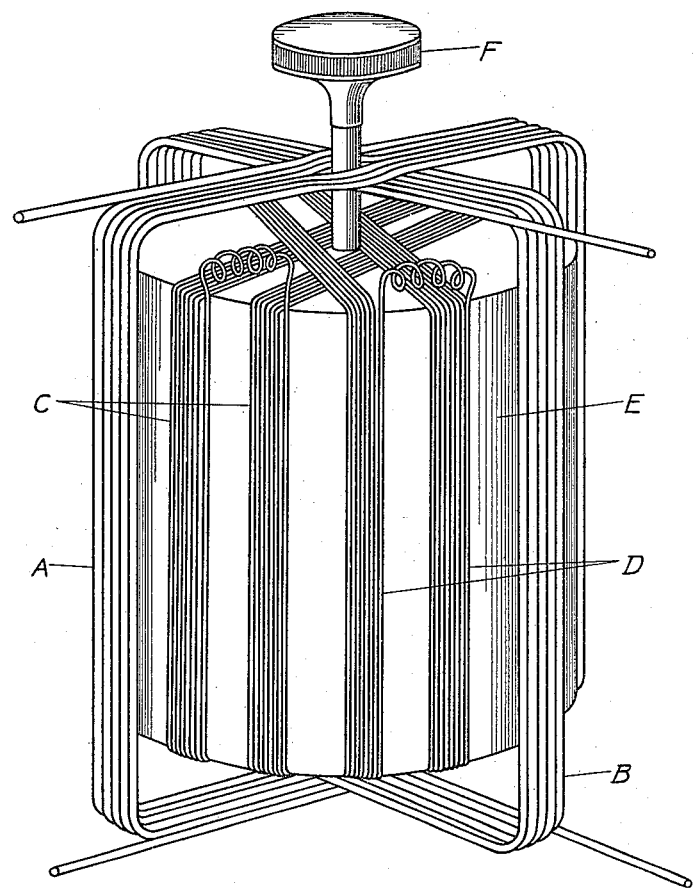
Inventor
GEORGE M. WRIGHT.
By his Attorney
Ira J. Adams

UNITED STATES PATENT OFFICE.

GEORGE MAURICE WRIGHT, OF CHESTERFIELD, ENGLAND, ASSIGNOR TO RADIO CORPORATION OF AMERICA, A CORPORATION OF DELAWARE.

RADIOGONIOMETER.

1,426,137.  Specification of Letters Patent.  Patented Aug. 15, 1922.

Application filed April 16, 1921. Serial No. 461,940.

*To all whom it may concern:*

Be it known that I, GEORGE MAURICE WRIGHT, a British subject, and a resident of Lyngrove, Cromwell Road, Chesterfield, England, have invented certain new and useful Improvements in Radiogoniometers, of which the following is a specification, accompanied by drawings.

In the "aperiodic aerial" system of direction finding, using two fixed aerials and a radiogoniometer, it is necessary to make the coupling between the tuned search coil circuit and the aerial circuits as tight as possible. This condition is desirable firstly in order to minimize the loss in signal strength due to the method of tuning, and secondly to increase the ratio of signal strength to stray effects which tend to distort the ideal polar diagram of the system.

A radiogoniometer usually consists of windings disposed on two coaxial cylinders, the inner cylinder carrying the search coil winding and being capable of rotation. In order to make the coupling between field and search coil windings as large as possible it is necessary to make the cylinder carrying the search coil of as large a diameter as possible in order to bring the windings close together. The magnetic field inside the outer winding is, however, not uniform but is more intense in the neighborhood of the conductors themselves. Consequently as the search coil is rotated the law of coupling between it and each field winding does not follow the sine law required theoretically and errors are produced.

In the positions of symmetry, i. e. when the plane of the search coil either coincides with that of either aerial coil or lies midway between the two no error will exist. Consequently the error curve takes the form of a cyclic variation making four complete cycles per revolution of the search coil and if one aerial coil is parallel to the 0–180° line of the scale pointer system, then the points of zero error will be 0, 45, 90, 135, etc., and the points of maximum error about $22\frac{1}{2}$, $67\frac{1}{2}$, etc.

According to my invention I construct a radiogoniometer having a double search coil with its two windings in planes making an angle of substantially 45°.

My invention is illustrated by the accompanying drawing, in which A, B, are the two aerial coils and C, D, are the two windings of a search coil, the two windings being arranged substantially in planes making an angle of 45° with one another. These windings are arranged upon the surface of a cylinder E which can be rotated by means of a handle F.

The coils may be connected in series. In this case the total E. M. F. induced in the winding by the currents in the two aerials is given by the algebraic sum of the E. M. F.'s in the individual coils. And though, as we have seen above, the difference of each E. M. F. from the ideal case may be quite considerable, yet since the differences are of opposite sign they cancel out and the radiogoniometer will read correctly in all positions of the search coil.

In some cases the error curve may not be quite symmetrical between successive zero points. In such a case the angle between the planes of the component coils of the search coil will not be exactly 45°. In this event the angle is chosen which gives the least mean error for all positions of the search coil.

Having now particularly described and ascertained the nature of my said invention and in what manner the same is to be performed, I declare that what I claim is: —

1. A radiogoniometer in which the search coil comprises two windings in planes at an acute angle with each other.

2. A radiogoniometer in which the search coil comprises two windings in planes at an angle with each other of 45° or less.

3. A radiogoniometer in which the search coil is formed of two windings arranged substantially in planes at an angle of 45° to one another.

4. A radiogoniometer comprising two stationary coils in planes at substantially right angles and a rotatable search coil comprising two windings in planes at an acute angle with each other.

GEORGE MAURICE WRIGHT.